Figure 1:
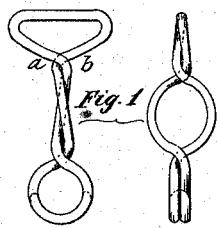

2 Sheets--Sheet 1.

J. T. FOSTER.
Snap-Hook.

No. 159,403.

Patented Feb. 2, 1875.

Witnesses:

Inventor:
John T. Foster

J. T. FOSTER.
Snap-Hook.

No. 159,403.

2 Sheets--Sheet 2.

Patented Feb. 2, 1875.

Witnesses:

Inventor:
John. T. Foster

UNITED STATES PATENT OFFICE.

JOHN T. FOSTER, OF JERSEY CITY, NEW JERSEY, ASSIGNOR TO FRANCIS C. NYE, OF NEW YORK CITY.

IMPROVEMENT IN SNAP-HOOKS.

Specification forming part of Letters Patent No. 159,403, dated February 2, 1875; application filed July 31, 1874.

CASE D.

*To all whom it may concern:*

Be it known that I, JOHN T. FOSTER, of Jersey City, in the county of Hudson and State of New Jersey, have invented certain new and useful Improved Snap-Hooks, of which the following is a specification:

This invention relates to an improved snap-hook, which is made of one piece of wire or other flexible and elastic material, and composed of the loop, sides, and two hooks, and has the plane of the loop the same as that of the hooks, and about at right angles with the plane of the sides.

Each arm of the snap-hook, between the loop and the hooks, has a convex bend, one above and the other below the horizontal plane of the loop, thus forming a swell in the sides of the snap-hook. The loop is made of a square, round, bow-shaped, oval, or other desired form, and the hooks are made so as to lock the arms together when they are crossed, after forming the swell, or in the reverse manner, with or without a crossing in the arms between the swell and the hooks. The hooks are formed in such positions that the close part of each hook covers the open part of the other, and thus the two hooks make a close eye. The arms between the loop and the swell are locked together, or not crossed, thus leaving an opening between the loop and the swell; and this improved snap-hook may be formed with the arms locked together on both sides of the swell, or locked together between the loop and the swell, and simply crossed between the swell and the hooks, or without any crossing between the swell and the hooks; and it may be formed with the arms locked together, or simply crossed between the swell and the hooks, and not crossed between the loop and the swell, or without crossing the arms on either side of the swell. The arms in the swell may stand, respectively, in such positions relatively to the plane of the swell, which is at right angles to the plane of the loop, and passes through the crossing or opening in the snap-hook between the loop and the swell, that each arm is kept wholly on the same side of such plane of the swell; or each arm may be on one side of such plane near the loop, and on the other side near the hooks. The upper convex bend of the swell is formed in the same arm as the lower hook, and the lower convex bend in the same arm as the upper hook; and when the arms are not locked together between the loop and the swell each bend of the swell may be formed in either arm. And in this improved snap-hook, when formed with the arms locked together between the loop and the swell, the arms have the same relative positions to each other in the hooks as where they cross between the loop and the swell, and hence that arm in which the upper hook is formed (looking at the snap-hook with the plane of the loop and hooks horizontal) is above the other arm at the crossing between the loop and the swell, and is bent downward at the swell; and, conversely, the arm in which the lower hook is formed is below the other arm at the same crossing, and is bent upward at the swell. Accordingly, in this form of the snap-hook, by compressing the sides of the swell, the arms are opened where they cross between the loop and the swell, as well as the hooks; and the arms may be locked together between the loop and the swell by passing either arm of the loop (as it stands horizontal) above or below the other.

When this snap-hook is formed with each arm wholly on the same side of the plane of the swell, as above mentioned, a ring or other article may be passed between the hooks, as well as the arms, where they are locked together on one or both sides of the swell, and thus attached to the loop, leaving the hooks ready to be snapped on another ring or other article, and in this way two links of a chain may be connected together by this snap-hook. The hooks in the snap-hook formed with each arm on opposite sides of such plane, near where they are locked together between the loop and the swell, and near the hooks, cannot be displaced in use, as each hook is prevented from being forced out of place to one side by the locking together of the arms between the loop and the swell; and in such snap-hook where the arms are locked together, or simply crossed between the swell and the hooks, but not between the loop and the swell, the formation of the bends in the arms from the loop to the hooks offers resistance to such displacement of either hook sufficient to prevent the same in actual use.

Figure 2:
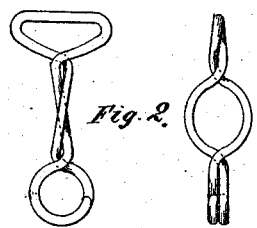

In the accompanying drawings making part of this specification, Figures 1 to 12, inclusive, on Sheet 1, represent, respectively, one side view and one edge view of twelve distinct modifications of the construction of my improved snap-hook; and Figs. 13 to 16, inclusive, on Sheet 2, represent, respectively, perspective views of four different sizes of one of my improved snap-hooks, of the same construction as that shown at Fig. 2 of Sheet 1.

Figure 3:
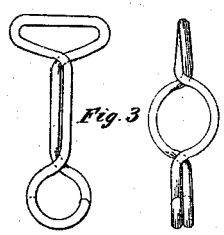
Figure 4:
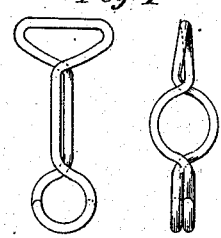
Figure 5:
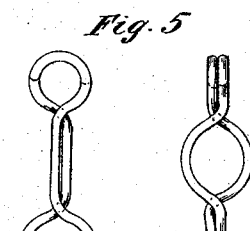
Figure 7:
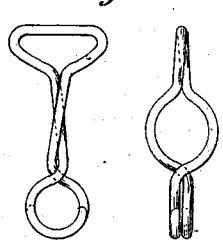
Figure 8:
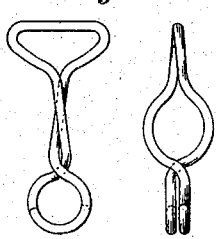
Figure 6:
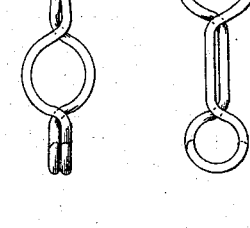
Figure 9:
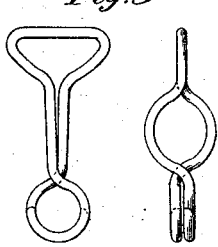
Figure 10:
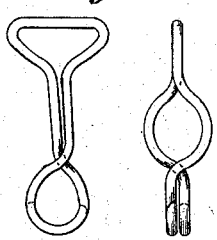

It will be perceived that the snap-hooks shown at Figs. 1 to 6, inclusive, have the arms locked together on both sides of the swell, and in those shown at Figs. 1, 3, and 5 that arm which passes over the other in the crossings, and in which the lower portion of the swell and the upper hook are formed, is on the right-hand side, a, of the loop, viewed as the wire is bent in forming the loop from the front of the machine, or as shown by the arrow, and the left-hand arm, b, at the loop passes under the other at the crossings, and has the upper portion of the swell and the lower hook formed in it, while in the snap-hooks shown at Figs. 2, 4, and 6 that arm which is above the other at the crossings, and in which the lower portion of the swell and the upper hook are formed, is on the left-hand side of the loop, and the right-hand arm passes under the other at the crossings, and has the upper portion of the swell and the lower hook formed in it. In the snap-hooks shown at Figs. 3 to 6, inclusive, each arm in the swell is wholly on the same side of the plane of the swell which is conceived to pass through the crossings, and perpendicular to the plane of the loop, while in the snap-hooks shown at Figs. 1 and 2 each arm of the swell is on opposite sides of such plane of the swell, near the loop and near the hooks. The snap-hooks shown at Figs. 7 to 10, inclusive, have the arms locked together between the swell and the hooks, but not crossed between the loop and the swell, thus leaving an opening between the arms where they pass from the loop to the swell. The lower portion of the swell, together with the upper hook, and the upper portion of the swell with the lower hook, are, respectively, shown at Figs. 7 and 9 formed in the same arm as at Figs. 1, 3, and 5, and shown at Figs. 8 and 10 formed in the same arm as at Figs. 2, 4, and 6. In the snap-hooks shown at Figs. 9 and 10 each arm of the swell stands wholly on the same side of the plane of the swell, similarly to the snap-hooks shown at Figs. 3 to 6, inclusive, while in those shown at Figs. 7 and 8 each arm of the swell stands crosswise of the said plane, being on one side of said plane near the loop, and on the other side near the hooks, similarly to the snap-hooks shown at Figs. 1 and 2.

Figure 11:
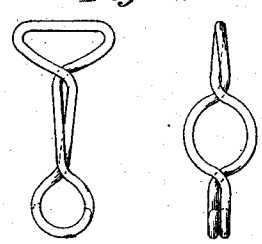
Figure 12:
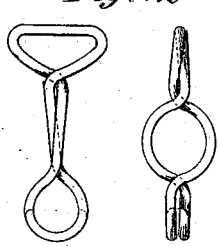
Figure 13:
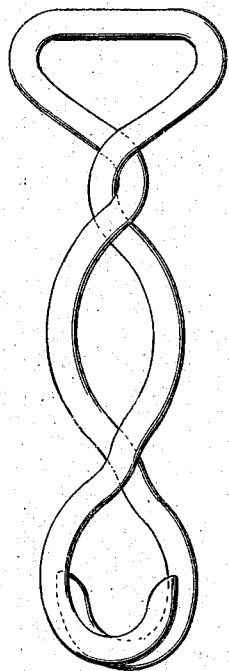
Figure 14:
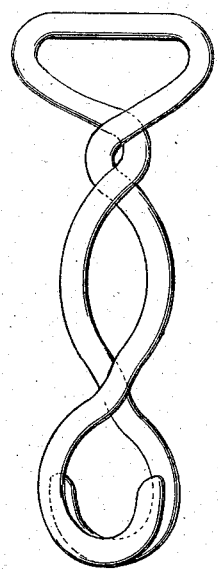
Figures 15, 16:
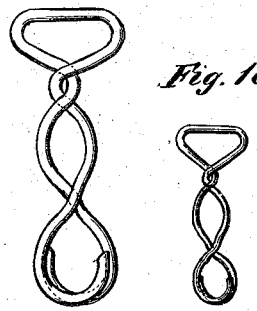

Modifications of my improved snap-hook are represented at Figs. 11 and 12, similar, respectively, to those shown at Figs. 1 and 2, except that the arms are not crossed between the swell and the hooks, but have an opening there between them, and the hooks are formed in the reverse manner to that in which they are formed in all of the snap-hooks shown at the other figures, as is clearly seen in the drawings.

These improved snap-hooks may be made wholly or in part by machinery or by hand, and the manner of constructing them will be sufficiently explained by describing how I prefer to make the snap-hooks shown at Figs. 1 and 2 of the drawings, Sheet A.

The piece of wire is first cut to the proper length for the snap-hook intended to be made, and then I prefer to mill or dress off the ends of the piece to a round or tapering form before bending it into the snap-hook. The loop is first made in a horizontal position by making two bends in the piece, near the middle, according to the length of loop required, and at equal distances from the ends, so as to bring out each hook of the same size around a fixed vertical former of the desired shape and size, with a movable horizontal plunger, forked to correspond with the former. This plunger also bends one of the arms up an inclined surface, and the other arm down another surface similarly inclined in the opposite direction, and this inclination of each arm is sufficient to allow the arms to cross each other after the loop is formed. The arms are next bent, respectively, over or under and across each other by two horizontal plungers moving at right angles to the first plunger, and acting against fixed stops, which make a nearly-square bend in each arm after the arms are crossed, and cause the arms to lie straight and lengthwise of the snap-hook. The swell is next formed in the sides of the snap-hook by two movable vertical plungers, one ascending and the other descending, formed exactly alike, with a male die in the end of the desired shape and size, which make the convex bend in each arm, and leave the unbent portions of the arms lying straight and lengthwise of the snap-hook. These convex middle bends are next carried across each other sufficiently to cause the straight portions of the arms to pass, respectively, over or under and across each other reversely to the first crossing next to the loop by two horizontal plungers moving at right angles to the first plunger. Each of these plungers is provided with a shoulder near its inner end, which is half-round, and the two projecting ends of the plungers overlap each other, and form a round mandrel within the swell, and of sufficiently smaller size than the swell to allow the convex bends of the swell to be sprung together when the arms are next crossed. The straight portions of each arm are next bent respectively up and down sufficiently to allow the arms to cross each other close to the swell by two other vertical movable plungers, one ascending and the other descending, which cross the arms in directions at right angles to the previous crossings, and make a nearly square bend in the straight portion of each arm, close to the swell, and leave the unbent portions of the arms lying straight. These plungers also spring the convex bends of the swell together round the mandrel within them, thus allowing the arms to be crossed, as last mentioned, and to be brought into position to be bent into the hooks. Two horizontal plungers, each formed exactly alike, with two male and two female dies in its inner end, acting against each other, and moving at right angles to the first plunger, next bend the arms and partially form the hooks, and cause the remaining portion of each arm to lie straight and sidewise of the snap-hook. These plungers thus lock the arms together between the swell and the hooks by carrying them, repectively, over or under and across each other, in the same manner as at the first crossing. A movable mandrel of the same size as the partially-formed hooks is next passed through the eye of the hooks, and a forked horizontal plunger, moving at right angles to the last-mentioned plungers, and formed with two longer and two shorter dies in its inner end, one of each on each side, the longer above the shorter die on one side and below on the other, and the two longer dies of the same size, as well as the two shorter, next act upon the wire, and the two longer dies support and preserve the portions of the hook already formed, while the two shorter dies bend the straight ends of the arms around the mandrel, which completes the bending of the hooks and finishes the snap-hook.

All of the plungers are grooved to fit the wire, conduct it in the proper direction, and make their respective bends in it without marring it. My machine for making this improved snap-hook is a distinct invention, and will be the subject of a separate patent.

The swell in the sides of the snap-hook affords a convenient means of opening the hooks to put them on a ring by compressing the two bends of the swell between the thumb and forefinger, and the loop being at right angles to the swell, the snap-hook is held at the same time more conveniently in the hand, and the formation of the bends further facilitates the opening of the hooks. In putting the snap-hook on a ring it is not necessary, however, to open the hooks until they are placed against the ring, when, by compressing the swell slightly, and, at the same time, pushing the snap-hook, it will slip easily on the ring. The snap-hook is easily taken off the ring by bringing the ends of the hooks against the inside surface of the ring and turning the snap-hook slightly, which opens the hooks and allows it to be pulled off the ring, when the hooks spring close together again.

These improved snap-hooks are the first that have ever been made in one or more pieces, by bending the material or otherwise, in which a swell is formed between the loop and eye or hooks, and standing at right angles to the plane of the loop. They are adapted to a great variety of uses in various arts, and are the only snap-hook formed of one piece of wire, and opening easily by hand to be put on a ring, which can be used to connect a strap with a ring at right angles to it without twisting the strap or ring. No snap-hook has been heretofore used for that purpose. An example of this use of my improved snap-hook is to connect the traces of harness with the rings of the whiffletree, where it will be found very advantageous and economical. As they may be made wholly by machinery, each snap-hook is a fac-simile of every other of the same class, and all are of perfect form, strength, and durability. They may be made of all sizes, from a quarter of an inch, or less, to five inches or more in length, of all sizes and descriptions, of wire or other flexible material, large and small, and in quantities abundant for their various uses at small cost above the material, thus affording a cheap, efficient, and convenient means of connecting a strap and ring or link, which may be readily disconnected by hand.

What I claim as my invention, and desire to secure by Letters Patent, is—

1. The swell in the sides of a snap-hook, in combination with the loop in a different plane, substantially as described.

2. The improved snap-hook composed of the loop and eye in one plane, and the swell standing out of said plane, and having the arms locked together on both sides of the swell, substantially as described.

JOHN T. FOSTER.

Witnesses:
H. W. YERINGTON,
FRANCIS C. NYE.